United States Patent [19]
Watanabe et al.

[11] Patent Number: 5,530,209
[45] Date of Patent: Jun. 25, 1996

[54] COORDINATE INPUT DEVICE AND METHOD FOR MANUFACTURING SAME

[75] Inventors: Takeshi Watanabe; Minoru Hirota; Osamu Sakai, all of Iwaki, Japan

[73] Assignee: Alps Electric Co., Ltd., Tokyo, Japan

[21] Appl. No.: 324,999

[22] Filed: Oct. 18, 1994

[30] Foreign Application Priority Data

Oct. 25, 1993 [JP] Japan .................................. 5-288590

[51] Int. Cl.$^6$ ..................................... G08L 21/00
[52] U.S. Cl. .................................. 178/18; 178/20
[58] Field of Search ............................ 178/18, 20; 341/5; 345/156, 173, 174

[56] References Cited

U.S. PATENT DOCUMENTS

| | | | |
|---|---|---|---|
| 3,911,215 | 10/1975 | Hurst et al. | |
| 4,620,062 | 10/1986 | Mizzi et al. | 178/20 X |
| 4,707,570 | 11/1987 | Ide et al. | 178/18 |
| 5,010,213 | 4/1991 | Moriwaki et al. | 178/18 |

Primary Examiner—Stephen Chin
Assistant Examiner—Paul Loomis
Attorney, Agent, or Firm—Guy W. Shoup; Patrick T. Bever

[57] ABSTRACT

A coordinate input device including a flexible upper substrate mounted on a rigid lower substrate and having a centrally-located input operating portion. The upper substrate includes a first resistance layer laminated thereon and X-axis electrodes formed on the first resistance layer on opposite sides of the input operating portion. The lower substrate includes a second resistance layer laminated thereon and Y-axis electrodes formed on the second resistance layer on opposite sides of the input operating portion. A spacer group is mounted between the upper and lower substrates to maintain a predetermined clearance, with spacers of the spacer group being having a height of 4 μm or less, and being arranged at a pitch in the range of 0.3 to 1.0 mm. A position detecting circuit is provided for locating a depressed portion of the upper substrate by measuring a change in voltage caused by contact between the first and second resistance layers. A method is also provided for making the coordinate input device.

7 Claims, 6 Drawing Sheets

COORDINATE INPUT DEVICE AND METHOD FOR MANUFACTURING SAME

BACKGROUND OF THE INVENTION

1. Field of the Invention

The present invention relates to a coordinate input device which detects coordinates corresponding to the position of an input pen for inputting handwritten characters or graphics to a computer, as well as a method for manufacturing the same.

2. Description of the Related Art

Heretofore, as an input device for the input of handwritten characters or graphics there has been known a voltage dividing type input device using such resistance films as shown in FIG. 9.

In the said input device, resistance films 32 and 33 are applied or vapor-deposited to opposed sides of two insulating films 30 and 31, and a plurality of insulating dot spacers 34 are disposed between the resistance films 32 and 33 to provide a predetermined spacing between both resistance films. X-axis electrodes are formed on two opposed sides at end portions of one resistance film 32, while Y-axis electrodes perpendicular to the X-axis electrodes are formed at end portions of the other resistance film. According to this conventional input device, a depressed position of the device is detected by applying voltage to the electrodes alternately and time-divisionwise through a processing circuit (not shown) and detecting voltage from the electrodes of the resistance film not applied with voltage to thereby detect the position in each direction.

In the above conventional input device, the inputside substrate is formed by film and characters or the like are inputted by rubbing the film surface with an input pen 35 having a spherical tip. At the time of inputting there occurs such a bend of the film 30 as shown in FIG. 9. As a result, a complicated bending stress is imposed on the resistance film 32 formed on the film 30, thus causing cracking or the like of the resistance film 32 and making it impossible to perform the detection of position. Further, the surface of the film 30 is flawed by rubbing with the input pen 35 and thus the commercial value of the input device is deteriorated in a short time.

SUMMARY OF THE INVENTION

It is the object of the present invention to provide a coordinate input device capable of preventing the occurrence of such cracking of resistance film and that of flaw of the film surface over a long time and thus having a long service life, as well as a method for manufacturing such input device.

In order to achieve the above-mentioned object, the coordinate input device of the present invention is characterized by including a flexible upper substrate having a first resistance layer, a lower substrate having a second resistance layer formed in opposition to the first resistance layer, and a group of spacers for ensuring a predetermined clearance between the upper and lower substrates, the height of each spacer being not larger than 4 µm.

The coordinate input device of the invention is also characterized in that the height of each spacer in the spacer group is set at a value not larger than 2.5 µm and that the spacer pitch is set at a value in the range of 0.3 to 1.0 mm.

Further, the method for manufacturing such coordinate input device according to the present invention is characterized by applying a resistance layer onto a substrate, forming a uniform spacer resist layer about 4 µm or less in thickness onto the resistance layer, and then subjecting the spacer resist layer to exposure and development to remove the other portion than the spacer group, thereby forming a spacer pattern.

The manufacturing method of the invention is also characterized in that the thickness of the spacer resist layer is set at a value not larger than 2.5 µm and that the spacer pattern is formed at a spacer pitch of 0.3 to 1.0 mm.

Thus, since the height of each spacer for ensuring a predetermined clearance between the upper substrate having flexibility and the lower substrate is set at a value not larger than 4 µm, it is possible to prevent over a long time the occurrence of cracking of the resistance layer formed on the upper substrate and that of flaw of the upper substrate surface. Moreover, since the spacers are formed as a pattern of 4 µm or less in height by exposure and development, it is possible to manufacture efficiently a coordinate input device improved in service life.

DETAILED DESCRIPTION OF THE PREFERRED EMBODIMENT

An embodiment of the present invention will be described in detail hereinunder with reference to the accompanying drawings.

Figure 1:
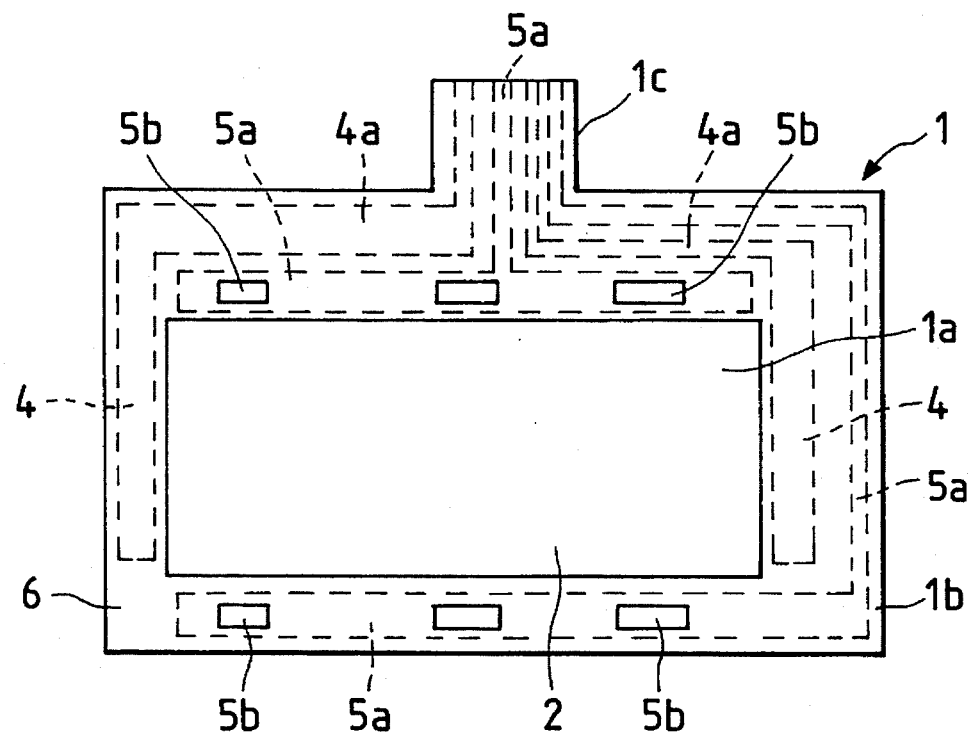
FIG. 1 is a plan view of a film substrate used in a coordinate input device according to an embodiment of the present invention.
Figure 2:
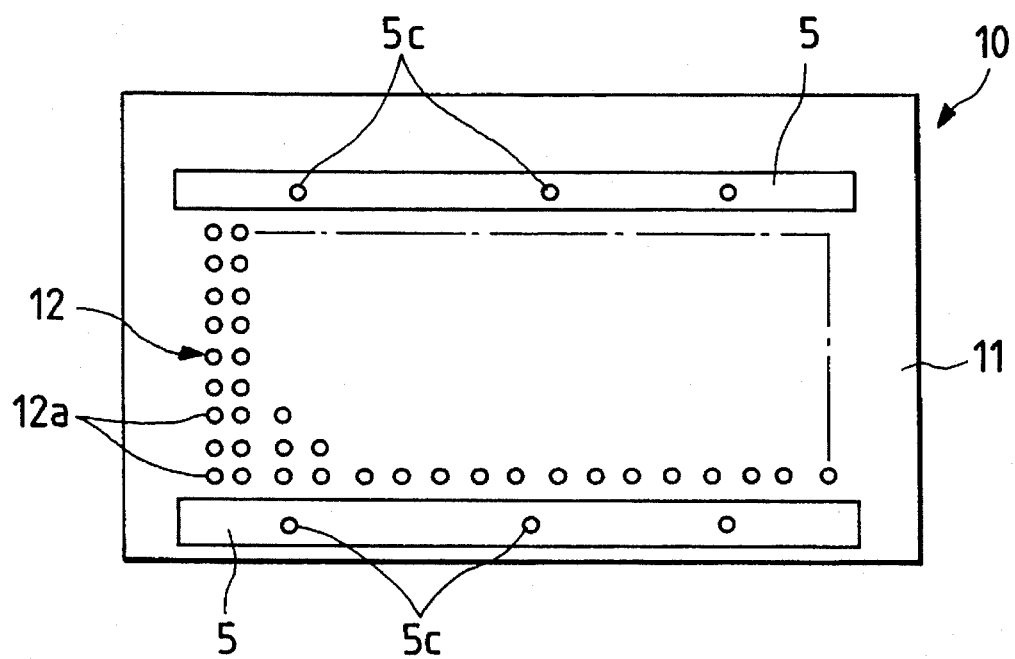
FIG. 2 is a plan view of a glass substrate used in the coordinate input device.
Figure 3:
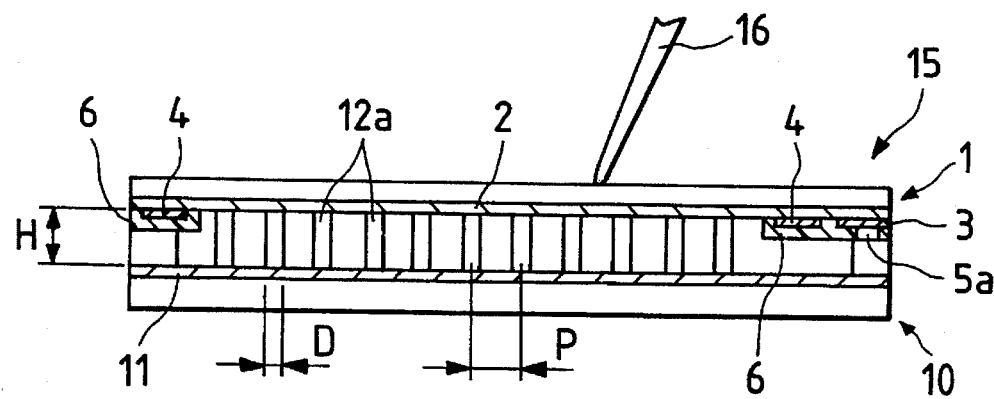
FIG. 3 is a sectional view of the coordinate input device.
Figure 4:
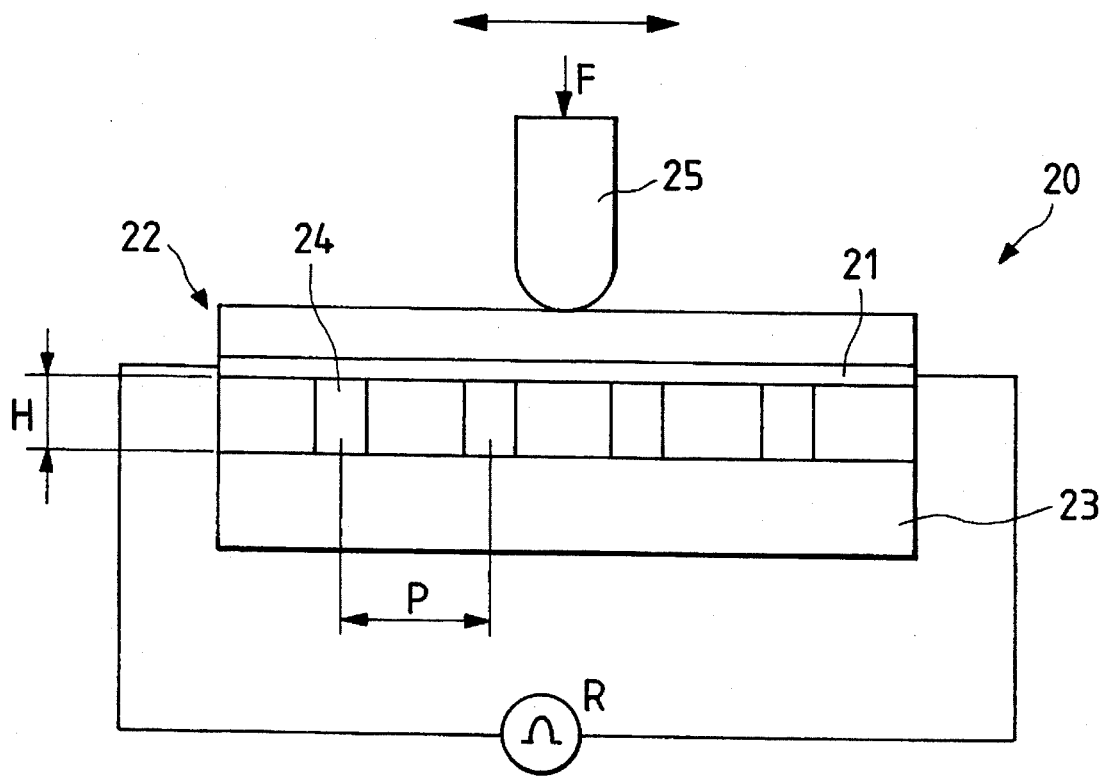
FIG. 4 is a diagram showing the whole of a laboratory device.
Figure 5:
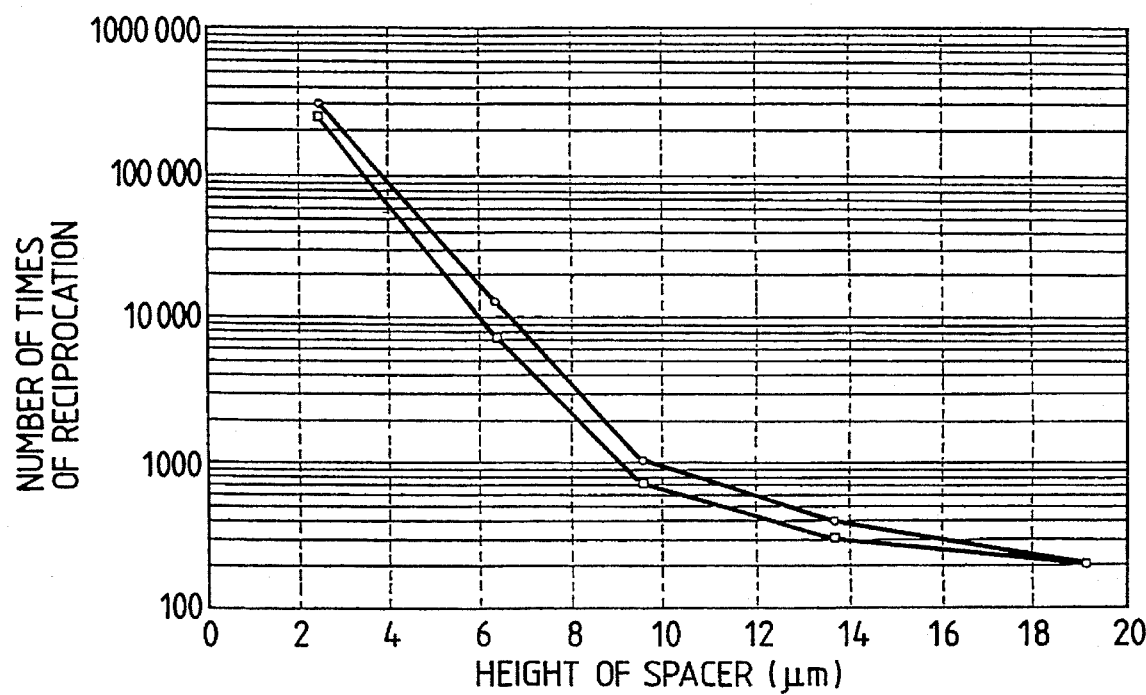
FIG. 5 is a diagram showing the relation between the height of spacer and the life until cracking of a resistance layer.
Figure 6:
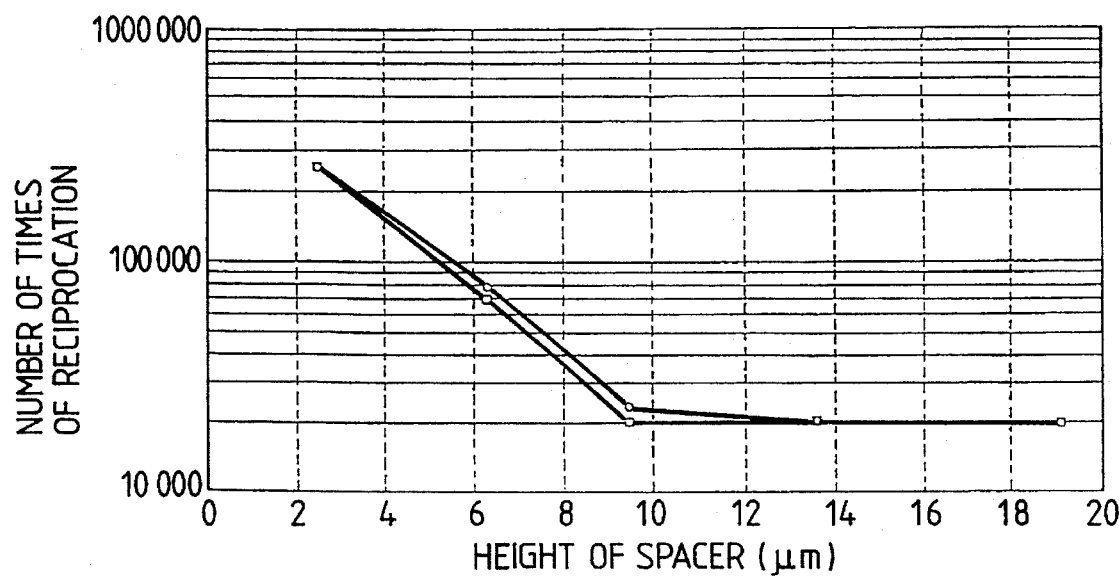
FIG. 6 is a diagram showing the relation between the height of spacer and flaw of the film substrate surface.

FIG. 1 is a plan view of a film substrate used in a coordinate input device embodying the present invention, FIG. 2 is a plan view of a glass substrate used in the coordinate input device, FIG. 3 is a sectional view of the coordinate input device, FIG. 4 is a diagram showing the whole of a laboratory device, FIG. 5 is a diagram showing the relation between the height of spacer and the life until cracking of a resistance layer, and FIG. 6 is a diagram showing the relation between the height of spacer and flaw of the film substrate.

The reference numeral 1 denotes a film substrate formed of a transparent polyester film having flexibility and having a thickness of about 100 to 200 µm. As shown in FIGS. 1 and 3, the film substrate 1 comprises an input operating portion 1a with only ITO (indium oxide) layer 2 as a resistance layer laminated to the central part of the film substrate and an electrode pattern portion 1b having, in a laminated form on the marginal portion of the film substrate 1, ITO layer 2, first resist layer 3, X-axis electrodes 4, X-axis electrode leads 4a, Y-axis electrode leads 5a and second resist layer 6. The film substrate 1 is further provided with a tail portion 1c, through which the X-and Y-axis leads 4a, 5a are connected to an external circuit.

In the input operating portion 1a, the ITO layer 2 is exposed, while the electrode pattern portion 1b is covered with the second resist layer 6 except transfer windows 5b of the Y-axis leads 5a.

The numeral 10 denotes a glass substrate. As shown in FIGS. 2 and 3, the whole surface of the glass substrate 10 is covered with an ITO layer 11, and on two opposed sides of the glass substrate 10 are formed Y-axis electrodes 5 and projecting transfer portions 5c on the ITO layer 11 in positions corresponding to the transfer windows 5b. Further, a group of spacers 12 are formed on the ITO layer on the side opposed to the input operating portion 1a. By the spacer group 12 there is normally ensured a predetermined clearance between the ITO layer 2 of the film substrate 1 and the ITO layer 11 of the glass substrate 10. Spacers 12a of the spacer group 12 are arranged in matrix form and are formed to have a diameter D of 20 to 50 µm, a height H of about 1.5 to 4 µm and a spacer pitch P of 0.3 to 1.0 mm. Preferably, the spacer pitch P is set at a little large value of 1.0 mm or so in the case where the input load is small, while it is made smaller with increase of input load, and the height H is set at about 2.5 µm or less irrespective of the magnitude of input load.

The coordinate input device 15 is of an overlapped structure of the film substrate 1 and the glass substrate 10 in a conducting state between the transfer windows 5b and the transfer portions 5c of the Y-axis electrode 5. The surface of the film substrate 1 is depressed with an input pen 16 to bring the ITO layers 2 and 11 into contact with each other, and characters, etc. are described for input while the input pen 16 is kept depressed. How to detect coordinates of the depressed position by the input pen 16 is detected by applying voltage to the electrodes alternately and time-divisionwise through a processing circuit (not shown) and detecting voltage from the electrodes of the resistance film not applied with voltage to thereby detect the position in each direction. A liquid crystal display is provided at the bottom of glass substrate 10. It is possible to obtain an input-output device by integrating coordinate input device with a liquid crystal display.

Next, with reference to FIGS. 4 to 6, the following description is now provided about the relation between the spacer height H and the occurrence of cracking of the ITO layer 2 and that of flaw on the surface of the film substrate 1 which are caused by bending of the film substrate upon depression of the input pen 6.

According to the structure of a laboratory device 20, as shown in FIG. 4, a predetermined clearance between a film substrate 22 having an ITO layer 21 and a glass substrate 23 is maintained by means of spacers 24, and both ends of the ITO layer 21 are connected to a resistor R. Load F is applied to an input pen 25 having a curved tip to bend the substrate 22, thereby causing the surface of the film substrate 22 to reciprocate right and left continuously. While the number of times of reciprocation of the input pen 25 is counted, a change in resistance value between both ends of the ITO layer 21 is detected by the resistor R, and when the percent change in resistance has reached 0.5% or more, it is judged that there occurred cracking in the ITO layer 21. As to the occurrence of flaw in the film substrate 22, it was judged visually.

Experiments were conducted at

① spacer pitches P of 1.0 mm and 0.3 mm and

② spacer heights H of 19.2 µm, 13.7 µm, 9.8 µm, 6.4 µm and 2.5 µm. For each height of spacer, the same experiment was performed four times.

| | Experiment Results | | | | |
|---|---|---|---|---|---|
| Height of spacer (µm) | 2.5 | 6.4 | 9.8 | 13.7 | 19.2 |
| P = 1.0 mm | | | | | |
| Average number of times of reciprocation in the occurrence of crack | 250000 | 7000 | 700 | 300 | 200 |
| Average number of times of reciprocation in the occurrence of flaw of film substrate | 250000 | 70000 | 20000 | 20000 | 20000 |
| P = 0.3 mm | | | | | |
| Average number of times of reciprocation in the occurrence of crack | 300000 | 15000 | 1000 | 400 | 200 |
| Average number of times of reciprocation in the occurrence of flaw of film substrate | 250000 | 80000 | 25000 | 20000 | 20000 |

It is FIGS. 5 and 6 that show the above experiment results graphically. As shown in both figures, as to the occurrence of crack and flaw, it turned out that at spacer heights of not larger than 10 µm the number of times of reciprocation increased suddenly, that is, the service life showed a tendency to prolongation. Further, at spacer heights not larger than 4 µm the number of times of reciprocation reaches 100,000, thus satisfying the service life of product required, and at the spacer height of 2.5 µm the number of times of reciprocation exceeds 200,000, thus fully solving the problem of cracking and flawing.

The method for manufacturing the above coordinate input device will be described below with reference to FIGS. 7(a) to 7(c) and FIGS. 8(a) to 8(d).

Figure 7A:
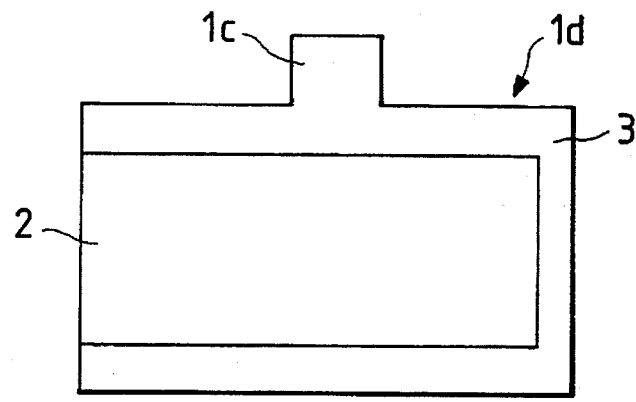
FIGS. 7(a), 7(b) and 7(c) show a manufacturing process for the film substrate used in the coordinate input device, in which 7(a) shows a first resist layer forming step, 7(b) shows an electrodes and electrode leads forming step and 7(c) shows a second resist layer forming step.
Figure 7B:
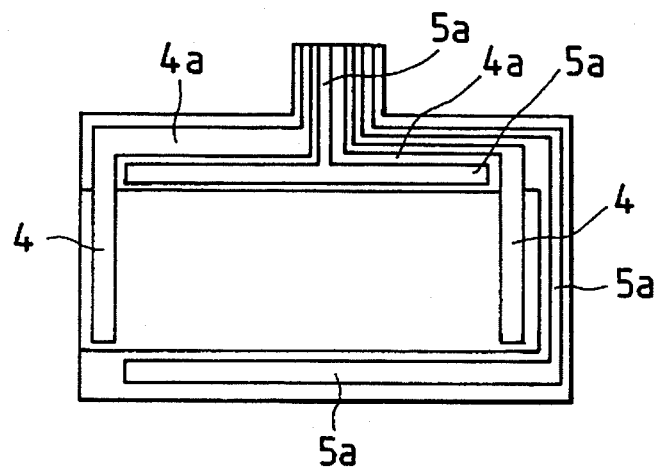
Figure 7C:
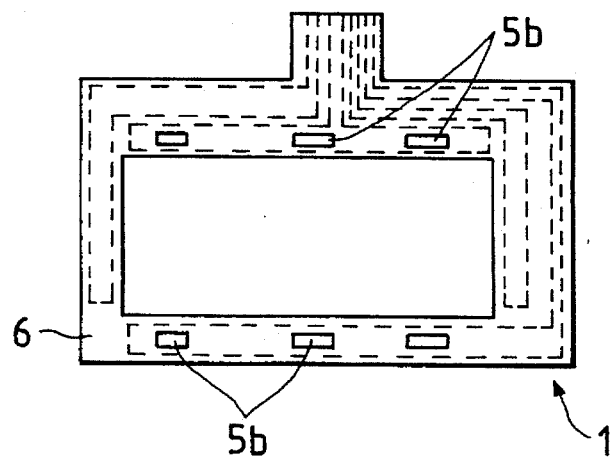

FIGS. 7(a) to 7(c) illustrate a manufacturing process for the film substrate, of which FIG. 7(a) shows a first resist layer forming step involving applying an ITO layer 2 to the whole of a back side 1d of the film substrate 1 and laminating and applying a first resist layer 3 to three marginal portions of the ITO layer 2, and FIG. 7(b) shows an electrodes and electrode leads forming step involving laminating and printing X- and Y-axis electrode leads 4a, 5a of silver on the first resist layer 3 and laminating X-axis electrodes 4 of silver to the ITO layer 2.

FIG. 7(c) illustrates a second resist layer forming step involving laminating a second resist layer 6 to the X-axis electrodes 4 and X- and Y-axis electrode leads 4a, 5a to form an electrode pattern 1b. In forming the second resist layer 6, the Y-axis electrode leads 5a are partially exposed, leaving only transfer windows 5b.

Figure 8A:
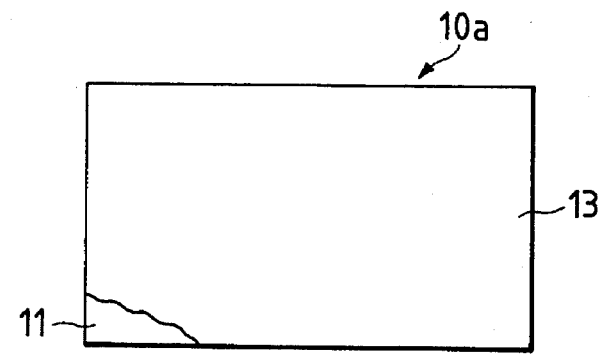
FIGS. 8(a), 8(b), 8(c) and 8(d) show a manufacturing process for the glass substrate used in the coordinate input device, in which 8(a) shows a spacer resist layer forming step, 8(b) shows a spacer pattern exposure and development step, 8(c) shows an electrodes forming step and 8(d) shows a transfer portion forming step.
Figure 8B:
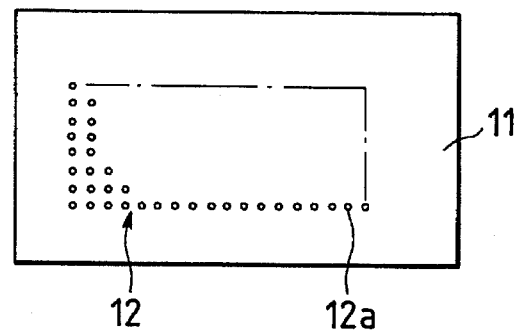
Figure 8C:
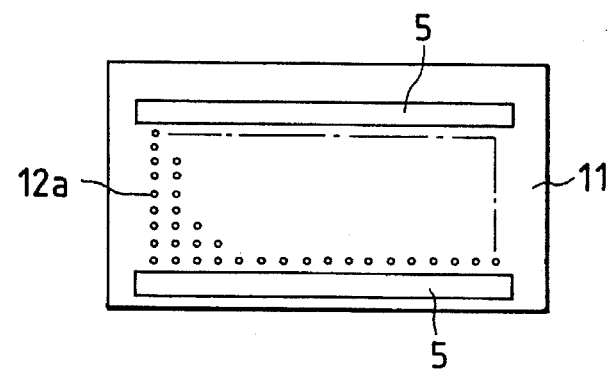
Figure 8D:
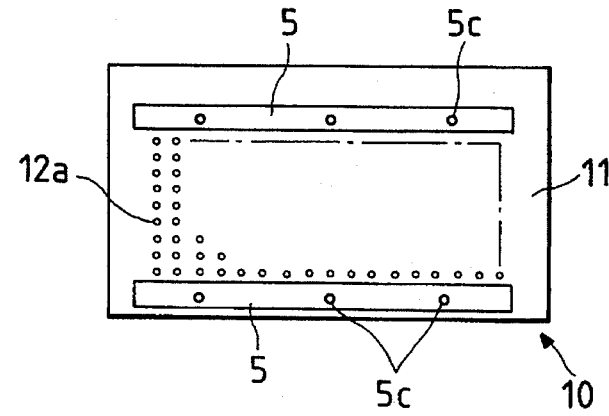
Figure 9:
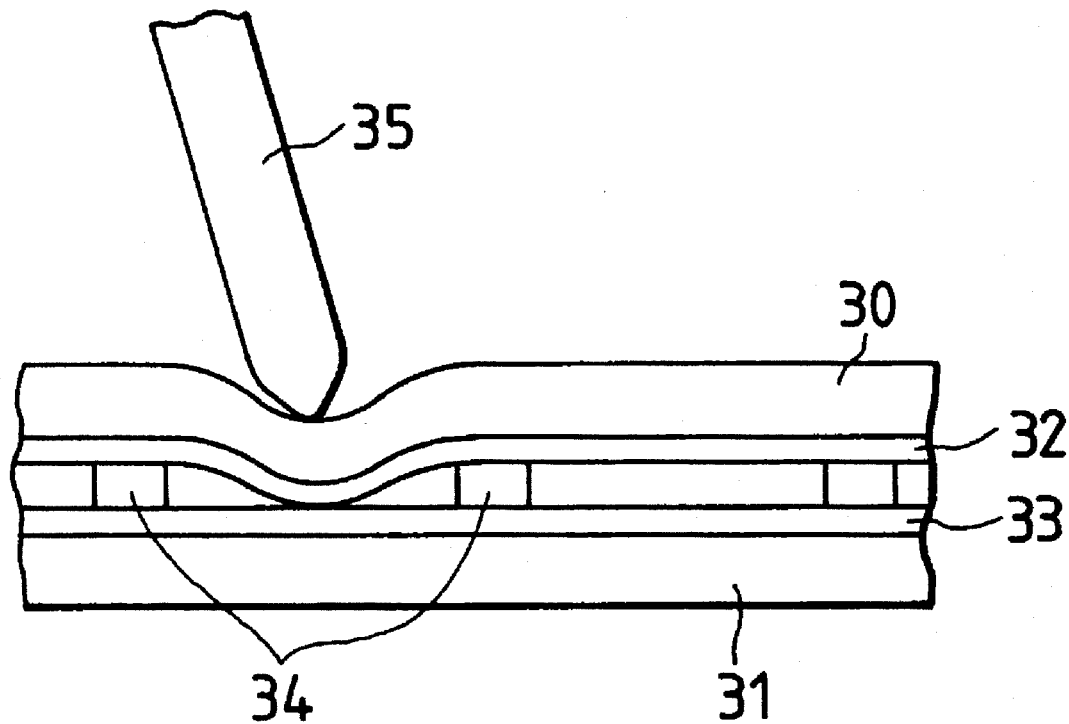
FIG. 9 is a sectional view of a conventional coordinate input device.

FIGS. 8(a) to 8(d) illustrate a manufacturing process for the glass substrate. More specifically, FIG. 8(a) shows a spacer resist layer forming step involving applying an ITO layer 11 to the whole of a back side 10a of the glass substrate 10 and then applying a spacer resist layer 13 to the whole surface of the ITO layer 11 by roll coating. The thickness of the resist layer 13 is about 2.5 μm or smaller. FIG. 8(b) shows an exposure and development step for spacer pattern, involving subjecting the spacer resist layer 13 to exposure and development to form a spacer group 12, with the ITO layer 11 being exposed, leaving spacers 12a. FIG. 8(c) shows a Y-axis electrodes 5 forming step involving forming Y-axis electrodes 5 on the ITO layer 11 by silver printing after the exposure and development step, subsequent drying to harden, and forming, by silver printing, projections as transfer portions 5c in positions corresponding to the transfer windows 5b in FIG. 7(c), as shown in FIG. 8(d). In this way the glass substrate 10 is completed.

Then, an adhesive is applied to the electrode pattern portion 1b of the film substrate 1 except the transfer windows 5b, and the film substrate 1 and the glass substrate 10 are laminated together to assemble the coordinate input device 15. As a result of this assembly, the transfer portions 5c and the Y-axis electrode leads 5a come into conduction with each other.

By such simple manufacturing process the spacer group 12 not larger than 2.5 μm in height can be formed accurately. In the above embodiment the coordinate input device is constituted by combining the transparent film substrate with the transparent glass substrate, and it is possible to obtain an input-output device by integrating this coordinate input device with, for example, a liquid crystal display. A single handwriting input device can also be afforded by combination of opaque film substrate and substrate.

According to the present invention, as set forth above, by forming spacers at a height not larger than 4 μm, not only the life until the occurrence of cracking of resistance layer but also the life until the occurrence of flaw of the film substrate surface can be prolonged, so it is possible to obtain a coordinate input device having a long service life. Besides, since spacers are formed by first forming a spacer resist layer of 4 μm or less in thickness and then subjecting it to exposure and development, it is possible to form spacers in a simple manner and hence possible to provide a coordinate input device less expensive and having a long service life.

What is claimed is:

1. A coordinate input device comprising:
   a flexible, upper substrate having a first resistance layer laminated thereto and X-axis electrodes formed opposedly to each other in the vicinity of both sides of said first resistance layer;
   a lower substrate having a second resistance layer laminated thereto in opposition to said first resistance layer and Y-axis electrodes formed in the vicinity of both sides of said second resistance layer perpendicularly to said X-axis electrodes;
   a spacer group for maintaining said upper substrate and said lower substrate through a predetermined clearance, said spacer group being formed at a height not larger than 4 μm and at a pitch in the range of 0.3 to 1.0 mm; and
   a position detecting circuit for detecting a depressed position of said upper substrate on the basis of a change in the value of voltage flowing through said first and second resistance layers when both resistance layers come into contact with each other upon depression of the upper substrate.

2. A coordinate input device according to claim 1, wherein the height of each spacer of said spacer group is set at 2.5 μm or less and the spacer pitch is set at a value in the range of 0.3 to 1.0 mm.

3. A coordinate input device according to claim 1, wherein said upper substrate is a transparent film substrate, said lower substrate is a transparent glass substrate, and a liquid crystal display is provided at the bottom of said lower substrate.

4. A coordinate input device according to claim 1, wherein said upper substrate comprises an input operating portion positioned nearly centrally and with said first resistance layer exposed, an electrode pattern portion positioned on a marginal portion and having said X-axis electrodes and X-axis electrode leads and a resist layer which covers said X-axis electrodes and said X-axis electrode leads, and a connector portion for connecting said X-axis electrode leads to an external circuit.

5. A coordinate input device according to claim 4, wherein a pair of Y-axis electrode leads perpendicular to said X-axis electrodes are formed on said marginal portion, said leads being covered with said resist layer except transfer windows, and said Y-axis electrodes on said lower substrate and said leads in said transfer windows are in conduction with each other.

6. A method for manufacturing a coordinate input device, comprising the steps of:
   forming a first resistance layer on an upper substrate;
   forming X-axis electrodes opposedly to each other in the vicinity of both sides of said first resistance layer;
   forming a second resistance layer opposedly to said first resistance layer on a lower substrate;
   forming Y-axis electrodes in the vicinity of both sides of said second resistance layer, said Y-axis electrodes being perpendicular to said X-axis electrodes;
   forming a uniform spacer resist layer on at least one of said first and second resist layers to a thickness of about 4 μm or less; and
   forming a spacer group by removing selected portions of said spacer resist layer through exposure and developing of said spacer resist layer such that a gap is maintained between said first resist layer and said second resist layer.

7. A method according to claim 6, wherein said spacer resist layer has a thickness of 2.5 μm or less, and the spacer pitch in said spacer group is set at a value in the range of 0.3 to 1.0 mm.

* * * * *